Nov. 24, 1959　　　W. O. ESSLER　　　2,914,684
TRANSISTOR PHASE DETECTOR
Filed March 18, 1957　　　　　　　　　3 Sheets-Sheet 1

INVENTOR
WARREN O. ESSLER
BY Moody and Goldman
ATTORNEYS

INVENTOR
WARREN O. ESSLER
BY
ATTORNEYS

United States Patent Office 2,914,684
Patented Nov. 24, 1959

2,914,684

TRANSISTOR PHASE DETECTOR

Warren O. Essler, Brookings, S. Dak., assignor to Collins Radio Company, Cedar Rapids, Iowa, a corporation of Iowa Application March 18, 1957, Serial No. 646,856

2 Claims. (Cl. 307—88.5)

This invention relates to phase detectors of the type which utilize switching in their operation.

The switching type of phase detector is commonly used in aircraft navigation equipment to determine aircraft bearing from a given station by enabling phase measurement between a pair of signals received from the station. Furthermore, such phase detectors can be used to determine aircraft distance from a given station by a phase measurement between transmitted and locally derived stable signals that were initially phase synchronized.

This invention uses a unique transistor arrangement which cannot be called either a common emitter, common base, or common collector arangement, since no electrode is common to both the input and output of any transistor used within the invention. Rather, the invention requires a two transistor arrangement that enables switching of the impedance presented by their dual emitters.

A first input signal, which is the switching signal is applied simultaneously between the base and collector of the dual transistors. A second signal is applied between their dual emitters. Phase-detection between the two signals is obtained by integrating the current responsive in the circuit of the dual emitters. A null condition in the integrated output is obtained when a 90° phase relationship exists between the two input signals; and the direct-current polarity of the integrated output depends upon which way the phase of the two compared signals deviates from the 90° condition.

The basic arrangement of the invention, using a pair of transistors, provides a half-wave type of operation. Due to the high impedance provided at the output of this invention, very little loss occurs from the integration means during the non-operative half cycles. However, the output level of the invenion can be doubled by utilizing an arrangement having two pairs of transistors to provide a full-wave type of operation.

The invention provides an unusually stable type of phase detector, wherein its operating characteristics vary very little at a given temperature or even with large temperature changes. With prior phase detectors utilizing diodes, it has been found that their output characteristics significantly change even when operating at a single temperature.

Furthermore, the very high impedance of the invention, when its input signals are off, permits its output-integrating circuit to retain its charged voltage level for a significant length of time. Thus, the invention is capable of providing a phase detector that can "remember" its last voltage level. This characteristic becomes important when phase-comparing signals, wherein one or both of them are being gated off and on, which is the case in some types of navigation systems.

Further objects, features and advantages of this invention will become apparent to a person skilled in the art upon further study of the specification and the drawings in which.

Figure 3A:
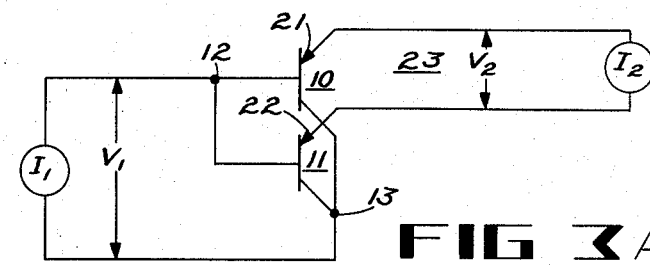
Figure 4:
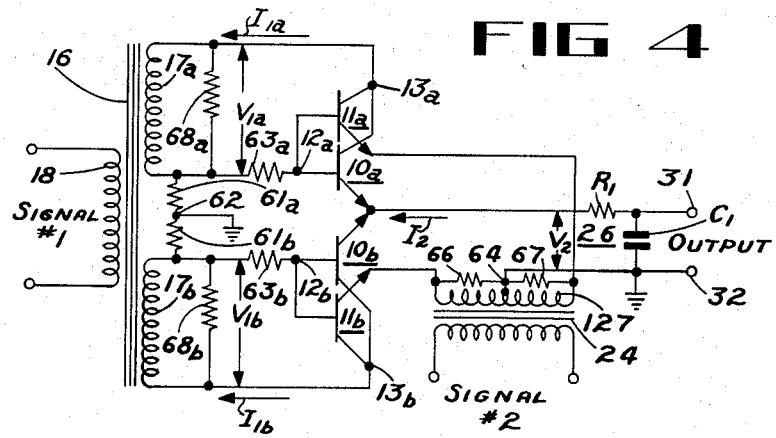
Figure 5:
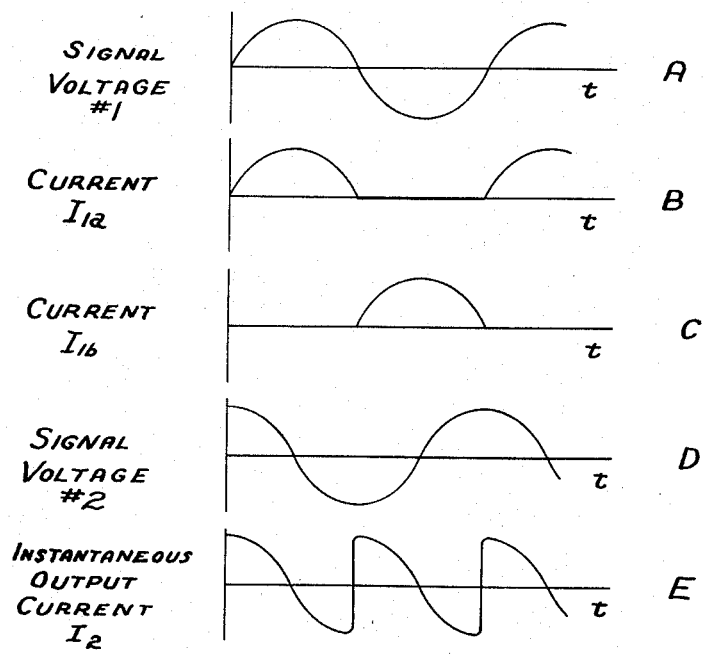

Figures 3A and B illustrate the characteristics of the particular transistor arrangement used in this invention;

Figure 4 is a schematic diagram of another form of the invention which provides full-wave operation; and, Figure 5 shows wave-forms used in explaining the operation of the invention in Figure 4.

Figure 1:
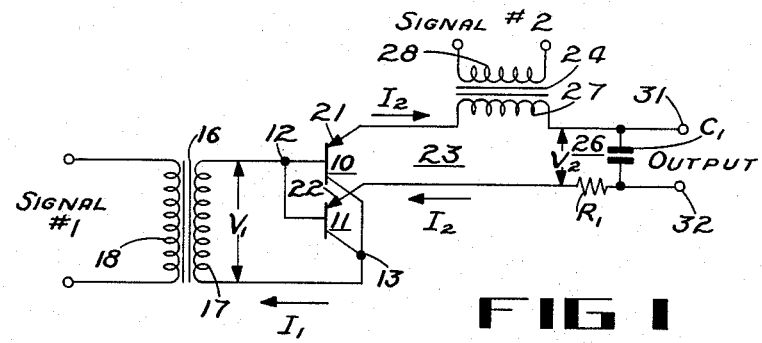
Figure 1 illustrates a basic form of the invention.

Now referring to Figure 1, a pair of transistors 10 and 11 have their base connected together at point 12 and their collectors connected together at point 13. The dual transistors used in this invention may be chosen from any type, although silicon transistors will generally give superior temperature stability. However, in any single form of the invention, dual transistors 10 and 11 are chosen to be the same type of transistor. For example, they can both be either NPN or PNP, but a given pair never includes opposite types. A first input signal is provided between the bases and collectors of transistors 10 and 11, that is between points 12 and 13. Hence, in Figure 1, the first input signal is provided through a transformer 16 having a secondary 17 connected between points 12 and 13 and its primary 18 connected to the first signal source. The first input signal appears as voltage $V_1$ between the collector and base of each of the transistors 10 and 11. Voltage $V_1$ is the switching voltage for the transistors and can be a sine wave of the type shown in Figure 2A. However, since the first signal provides switching, it can also be a square-wave type of signal.

Figure 2:
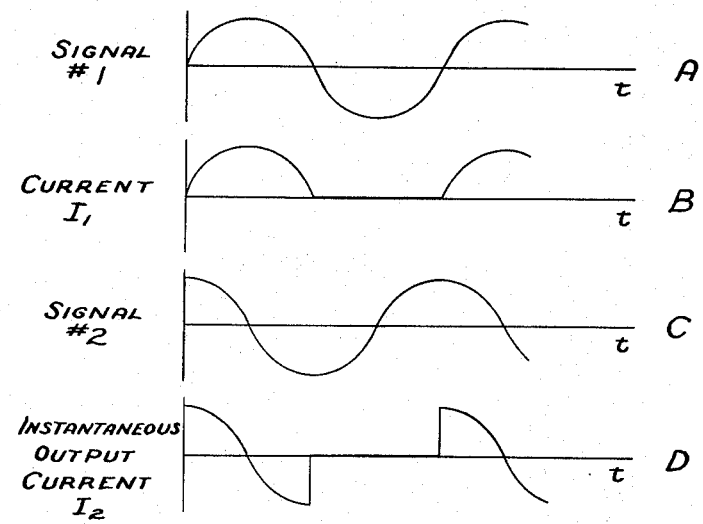
Figure 2 shows wave-forms used in explaining the operation of the circuit in Figure 1.

Due to the non-linear input characteristics of transistors, their input circuit current $I_1$ caused by voltage $V_1$ has a rectified appearance, as shown in Figure 2B.

The dual emitters 21 and 22 are connected into a circuit 23 that includes the injection of a second input signal through another transformer 24 and includes an integrating circuit 26, comprising a resistor $R_1$ and capacitor $C_1$. The integrating circuit is connected in series with the secondary 27 of transformer 24 between emitters 21 and 22.

The primary 28 of transformer 24 is connected to the second signal source, which provides the wave illustrated in Figure 2C having the same frequency as the first signal.

The output of the invention is obtained from the direct-current components in the dual-emitter circuit and is taken from a pair of output terminals 31 and 32 connected across capacitor $C_1$ of integrating filter 26.

The impedance looking into dual emitters 21 and 22 is very high when input current $I_1$ is zero or negative. Therefore, integrator circuit 26 can have a very long time constant.

Figure 3B:
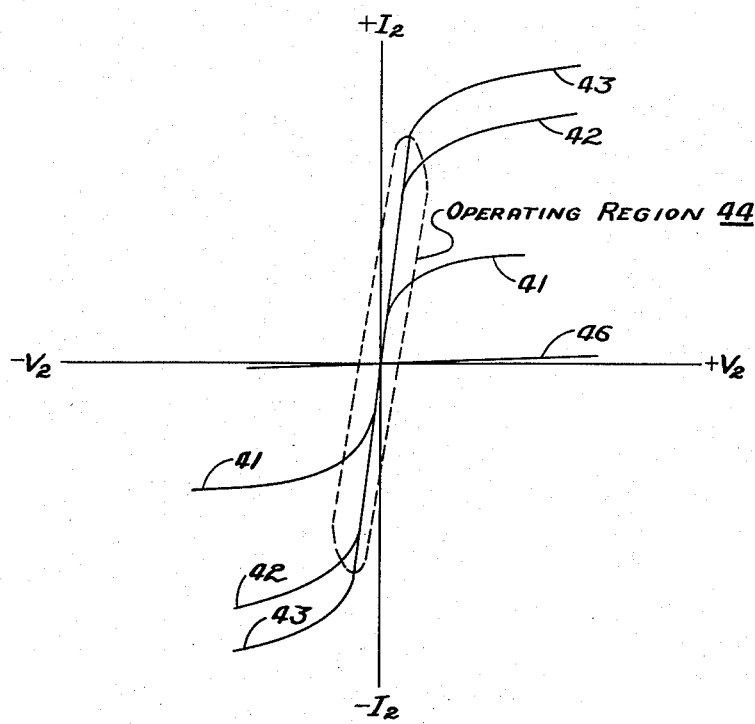

The output impedance characteristics of dual transistors 10 and 11 can be observed from Figures 3A and 3B, which illustrate the current-voltage relationships in the dual emitter circuit at different constant values of base-collector circuit current. Thus, in Figure 3B, a series of curves 41, 42, and 43 are shown having respectively higher positive values of input current $I_1$. Note that these various positive input values have a linear operating region 44, which represents a linear resistance. It can be seen that a change in the positive value of input curent $I_1$ does not change the input resistance of the pair of transistors within their linear operating region.

On the other hand, a negative input voltage permits very little curent $I_2$ and provides, a very high resistance output characteristic represented by the slope of another curve 46.

Consequently, a positive voltage $V_1$ causes low dual-emitter resistance, which might be of the order of 50 ohms; an, on the other hand, a negative input voltage $V_1$ causes a dual-emitter resistance of the order of a megohm.

Hence, when an alternating input signal $V_1$ is applied, the dual-emitter resistance is switched alternately from 50 ohms to one megohm with the positive and negative loops, respectively, of input voltage $V_1$.

Figures 1 and 3A show PNP transistors, and it is obvious that the same relationships hold with reversed polarities when the dual transistors are the NPN type.

The circuit of Figure 1 is operated in a half-wave manner because it provides output current only during the positive loops of input signal $V_1$.

The integrated output of the invention is zero when the two input signals have a 90° phase relationship. This occurs because the impedance level of the dual-emitters is switched by the first input from a high to a low value (and vice versa) at the instant that the second input signal is at its peak values. The emitter switching then causes the instantaneous current $I_2$ illustrated in Figure 2D. Thus, the switching provides output current that begins at the peak of each positive loop of the second signal voltage and ends at the peak of the following negative loop, because it is at these resistances that positive loops of switching voltage $V_1$ begin and end. No current output is provided during the negative loops of the twitching signal because of the very high dual-emitter impedance which then exists. It can be realized by viewing Figure 2D that the integrated value of this wave is zero, since the areas of the positive and negative portions of the wave are equal. As a result, no charge is acquired by capacitor $C_1$ during the 90° condition of the input signals.

If the phase relationship between the input signals changes from the 90° condition, the output will not then switch at precisely the peaks of the second signal, but will switch a little later or a little earlier, depending upon which way the phase changes. As a result, the integrated value of the the voltage will no longer be zero but will be either positive or negative depending upon the phase condition.

Figure 4 illustrates a full-wave version of the invention. Figure 4 includes first signal transformer 16 which has a pair of equal opposite-phase secondary windings 17a and 17b, which are connected together at adjacent ends by equal resistors 61a and 61b that have a common point 62 connected to ground. A pair of loading resistors 68a and 68b are connected across windings 17a and 17b. Two sets of dual transistors are used in this embodiment, which are all of the NPN type. Each pair of dual transistors is connected to its adjacent secondary 17 in the same manner as in Figure 1, except that a resistor 63 is serially connected with each base.

Second signal transformer 24 in Figure 4 has a secondary 127 with a grounded center tap 64. A pair of resistors 66 and 67 are connected across the opposite halves of secondary 127.

Low-pass or integrating filter 26 comprising resistor $R_1$ and capacitor $C_1$ is connected in series between center tap 64 and the emitters of transistors 10a and 10b. One end of secondary 127 is connected to the emitter of transistor 11a and the other end of secondary 127 is connected to the emitter of transistor 11b.

Each half a or b of the circuit in Figure 4 includes a separate set of dual transistors, a separate opposite-phase source of the first input signal, and a separate opposite-phase source of the second input signal. The opposite halves a and b of the system are half-wave devices of the same type as described in connection with Figure 1. As a result of the opposite phasing of both input signals to the opposite halves of the circuit in Figure 4, they provide instantaneous output currents $I_2$ during opposite half-wave portions of the second input signal. Hence, the arrangement in Figure 4 connects the output of both half-wave devices to a single integrating circuit, which sequentially combines their outputs; and the combined outputs appear to the integration circuit as full-wave operation. Consequently, the system in Figure 4 is capable of providing twice the integrated output level of the half-wave system in Figure 1. Figures 5A through 5C illustrate the first input signal and the resulting currents provided in the input circuits of both pairs of transistors in Figure 4. Figure 5D shows the second input signal; and Figure 5E illustrates the full-wave type of instantaneous current $I_2$ appearing to the input of the integration circuit.

Although this invention has been described with respect to particular embodiments thereof, it is not to be so limited, as changes and modifications may be made therein which are within the full intended scope of the invention as defined by the appended claims.

I claim:

1. Transistor means for phase comparing first and second signals comprising a first pair of transistors of the same type, and a second pair of transistors of the same type, a first transformer having its primary connectable to said first signal, and having a pair of opposite-phased secondary windings, with one winding being connected between the bases and collectors of said first pair of transistors, and its other winding being connected between the bases and collectors of said second pair of transistors, resistive means connecting one side of each of said secondary windings to ground, an integration circuit having one input terminal connected to the emitters of one transistor in each pair, a second transformer having its primary connectable to said second signal, and having a secondary with a center tap connected to the other side of said integration circuit, one end of said center-tapped secondary being connected to the emitter of the remaining transistor in said first pair, and the opposite end of said center-tapped secondary being connected to the emitter of the remaining transistor in the second pair, with the direct-voltage output of said integration circuit being dependent upon the phase between said first and second signals.

2. Transistor means for phase comparing first and second signals, comprising a first pair of transistors of the same type having their bases connected together and their collectors connected together, and a second pair of transistors of the same type having their bases connected together and their collectors connected together, a first transformer having its primary connectable to said first signal, and having a pair of opposite-phased secondary windings, resistor means connected between one end of each of said secondary windings, and a point on said resistor means being connected to ground, one of said secondary windings having one end connected to the collectors of said first pair, and a first resistor connected between the other end of said one winding and the bases of said first pair, the other secondary winding having one end connected to the collectors of said second pair of transistors, and a second resistor connected between the other end of said other secondary winding and the bases of said second pair of transistors, a second transformer having its primary connectable to said second signal, and having a center-tapped secondary, with its center-tap connected to ground, one end of said center-tapped secondary connected to the emitter of one transistor in said first pair, and the opposite end of said center-tapped secondary being connected to the emitter of one transistor in said second pair, an integration circuit having one input side connected to ground, and its opposite input side connected in common to the emitters of the remaining transistors in said first and second pairs, a plurality of resistors respectively connected across said secondary windings, and the direct-voltage output of said integration circuit being dependent upon the phase between said first and second signals.

(References on following page)

References Cited in the file of this patent

UNITED STATES PATENTS

| | | |
|---|---|---|
| 2,486,776 | Barney | Nov. 1, 1949 |
| 2,713,665 | Raisbeck et al. | July 19, 1955 |
| 2,780,725 | Johanson | Feb. 5, 1957 |
| 2,795,762 | Sziklai | June 11, 1957 |
| 2,808,990 | Van Allen | Oct. 8, 1957 |
| 2,846,652 | Cluwen | Aug. 5, 1958 |
| 2,850,236 | Schaefer et al. | Sept. 2, 1958 |

FOREIGN PATENTS

| | | |
|---|---|---|
| 1,125,813 | France | July 16, 1956 |